US012682488B2

(12) United States Patent
Ramanathan et al.

(10) Patent No.: US 12,682,488 B2
(45) Date of Patent: Jul. 14, 2026

(54) LOOP CLOSURE USING MULTI-MODAL SENSOR DATA

(71) Applicant: ObjectVideo Labs, LLC, Tysons, VA (US)

(72) Inventors: Narayanan Ramanathan, Chantilly, VA (US); Timon Meyer, Centreville, VA (US); Glenn Toumier, Vienna, VA (US); Donald Gerard Madden, Columbia, MD (US); Aditya Shiwaji Rasam, McLean, VA (US)

( * ) Notice: Subject to any disclaimer, the term of this patent is extended or adjusted under 35 U.S.C. 154(b) by 417 days.

(21) Appl. No.: 18/307,661

(22) Filed: Apr. 26, 2023

(65) Prior Publication Data

US 2023/0351634 A1     Nov. 2, 2023

Related U.S. Application Data

(60) Provisional application No. 63/336,022, filed on Apr. 28, 2022.

(51) Int. Cl.
| | |
|---|---|
| *G06T 7/73* | (2017.01) |
| *B64U 10/00* | (2023.01) |
| *B64U 101/30* | (2023.01) |
| *G06T 7/00* | (2017.01) |
| *G06V 20/17* | (2022.01) |

(52) U.S. Cl.
CPC ............... *G06T 7/74* (2017.01); *B64U 10/00* (2023.01); *G06T 7/97* (2017.01); *G06V 20/17* (2022.01); *B64U 2101/30* (2023.01); *G06T 2207/10004* (2013.01); *G06T 2207/10028* (2013.01)

(58) Field of Classification Search
CPC ................... G06T 7/70–77; G06T 7/97; G06T 2207/10004; G06T 2207/10028; G06T 1/00–0014; B64U 10/00–16; B64U 10/80; B64U 2101/30; B64U 2101/70
See application file for complete search history.

(56) References Cited

U.S. PATENT DOCUMENTS

| | | | | |
|---|---|---|---|---|
| 10,430,968 B2 * | 10/2019 | Houts | ..................... | G01S 17/90 |
| 10,445,616 B2 * | 10/2019 | Tom | ...................... | G06V 10/42 |
| 10,719,955 B2 * | 7/2020 | Guerreiro | .............. | G06V 20/56 |

(Continued)

OTHER PUBLICATIONS

Arshad, Saba, and Gon-Woo Kim. "Role of deep learning in loop closure detection for visual and lidar slam: A survey." Sensors 21.4, p. 1243 (Year: 2021).*

(Continued)

*Primary Examiner* — Scott A Rogers
(74) *Attorney, Agent, or Firm* — Fish & Richardson P.C.

(57) ABSTRACT

Methods, systems, and apparatus, including computer programs encoded on computer-storage media, for obtaining a sample Light Detection and Ranging (LIDAR) profile generated by a drone; selecting a reference position based on the sample LIDAR profile; determining a LIDAR profile-based translation and rotation relative to a reference LIDAR profile of the reference position; determining an image-based translation and rotation relative to a reference image of the reference position; determining whether the LIDAR profile-based translation and rotation and the image-based translation and rotation satisfy a similarity threshold; and verifying, using a result of the determination, a predicted position of the drone.

20 Claims, 5 Drawing Sheets

(56) References Cited

U.S. PATENT DOCUMENTS

| | | | | |
|---|---|---|---|---|
| 10,726,579 | B1 * | 7/2020 | Huang | G01S 7/4972 |
| 10,859,684 | B1 * | 12/2020 | Nabatchian | G06T 7/13 |
| 11,102,382 | B2 * | 8/2021 | Yachida | G06V 40/161 |
| 11,153,503 | B1 | 10/2021 | Ebrahimi Afrouzi et al. | |
| 11,176,708 | B2 * | 11/2021 | Kohlmann | H04N 13/246 |
| 11,768,920 | B2 * | 9/2023 | Kim | G06F 18/251 |
| | | | | 382/103 |
| 11,835,627 | B2 * | 12/2023 | Tan | G01S 17/89 |
| 11,922,591 | B2 * | 3/2024 | Fleischman | G06F 3/04815 |
| 11,940,539 | B2 * | 3/2024 | Diederichs | G01S 7/4808 |
| 11,971,961 | B2 * | 4/2024 | Lee | G01S 7/4972 |
| 12,148,316 | B2 * | 11/2024 | Moster | B64U 10/13 |
| 12,190,541 | B2 * | 1/2025 | Babin | G01S 17/86 |
| 12,339,405 | B1 * | 6/2025 | Yuan | G06T 7/70 |
| 2018/0204338 | A1 | 7/2018 | Narang et al. | |
| 2019/0180468 | A1 | 6/2019 | Hildreth | |
| 2021/0012166 | A1 * | 1/2021 | Braley | G06F 18/251 |
| 2021/0034843 | A1 | 2/2021 | Sivan et al. | |
| 2021/0116941 | A1 * | 4/2021 | Lee | G05D 1/0094 |
| 2021/0243339 | A1 * | 8/2021 | Yachida | G06T 7/74 |
| 2021/0311504 | A1 * | 10/2021 | Chai | G05D 1/106 |
| 2022/0215561 | A1 * | 7/2022 | Zhu | G06T 7/75 |
| 2023/0099968 | A1 * | 3/2023 | Ramanathan | G05D 1/104 |
| | | | | 700/259 |
| 2024/0087162 | A1 * | 3/2024 | Araújo | G06T 7/11 |
| 2025/0076875 | A1 * | 3/2025 | Liu | G05D 1/228 |

OTHER PUBLICATIONS

Chen, Shoubin, et al. "A lidar/visual slam backend with loop closure detection and graph optimization." Remote sensing 13.14, p. 2720 (Year: 2021).*

Kumar et al. "LiDAR and Camera Fusion Approach for Object Distance Estimation in Self-Driving Vehicles." Symmetry 2020, 12, 324, pp. 1-23 (Year: 2020).*

Leahy et al. "Enhancing Cross-Modal Camera Image and LiDAR Data Registration Using Feature-Based Matching." Remote Sens. 2025, 17, 357, pp. 1-19 (Year: 2025).*

PCT International Search Report and Written Opinion in International Appln. No. PCT/US2023/020234, mailed on Jul. 17, 2023, 9 pages.

* cited by examiner

First Image

Second Image

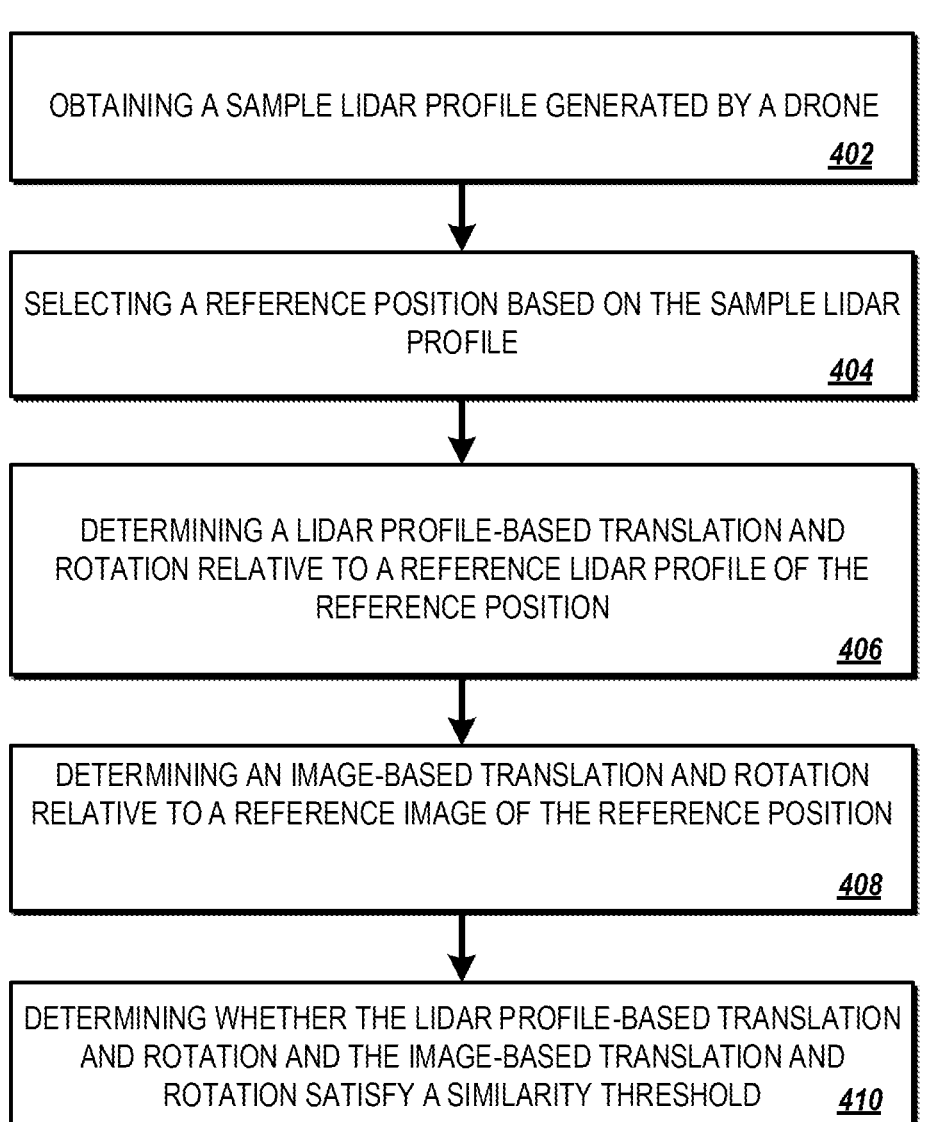

OBTAINING A SAMPLE LIDAR PROFILE GENERATED BY A DRONE

*402*

SELECTING A REFERENCE POSITION BASED ON THE SAMPLE LIDAR PROFILE

*404*

DETERMINING A LIDAR PROFILE-BASED TRANSLATION AND ROTATION RELATIVE TO A REFERENCE LIDAR PROFILE OF THE REFERENCE POSITION

*406*

DETERMINING AN IMAGE-BASED TRANSLATION AND ROTATION RELATIVE TO A REFERENCE IMAGE OF THE REFERENCE POSITION

*408*

DETERMINING WHETHER THE LIDAR PROFILE-BASED TRANSLATION AND ROTATION AND THE IMAGE-BASED TRANSLATION AND ROTATION SATISFY A SIMILARITY THRESHOLD    *410*

LOOP CLOSURE USING MULTI-MODAL SENSOR DATA

CROSS-REFERENCE TO RELATED APPLICATION

This application claims the benefit of U.S. Provisional Application No. 63/336,022, filed Apr. 28, 2022, the contents of which are incorporated by reference herein.

BACKGROUND

A monitoring system for a property can include various components including sensors, e.g., cameras, and other devices. For example, the monitoring system may use the camera to capture images of people or objects of the property. Sometimes a monitoring system can use a drone to capture sensor data.

SUMMARY

This specification describes techniques, methods, systems, and other mechanisms for detecting loop closures using multi-modal sensor data. Loop closure (or the act of loop closing) may signify that a drone, after traversing through an arbitrary length of an environment, has returned to a previously visited region in the environment. For example, the drone may initially map out a property and then, while later traveling through the property, use loop closure to determine where the drone is within the property. Loop closure can also occur during mapping of a property. Loop closing may assert the physical location and the orientation of a drone, aiding trajectory planning for the successful completion of a remainder of the task. For example, the drone can continually estimate its location in the environment using visual inertial odometry (VIO) and periodically use loop closure to verify an accuracy of the estimated locations, correct for accumulated odometry drift, or both.

Drones can use vision (camera feed), time-of-flight (TOF), Light Detection and Ranging (LIDAR), sonar, or a combination of these, among other data streams that come from built-in sensors for both mapping the space ahead of time and in successfully navigating the mapped space when performing a task. A loop-closure obtained from one data stream, e.g., LIDAR, may be verified using information available from other simultaneously available data streams, e.g., TOF, Vision, or both, among others.

To determine where a drone is currently, the drone may initially determine a rotation and translation of a reference LIDAR profile that was obtained at a known position to a sample LIDAR profile just obtained by the drone. The drone may then determine a rotation and translation based on an image previously obtained at the known position and a sample image just obtained by the drone. The drone may verify a position of the drone based on whether the rotations and translations for the LIDAR profiles and the images satisfy a similarity threshold, e.g., match.

Advantageous implementations can include one or more of the following features. For example, techniques described can enable verification of loop closure obtained from one data stream using information from another data stream. While loop closures can help localization or intermediate localization, incorrectly identified loop closures can exacerbate sensor drift and incorrect mapping resulting in drone malfunction, harm to property, or harm to person. The techniques described in this document can help improve robot navigation by verifying loop closure determinations to be used, e.g., for subsequent localization. Loop closures, e.g., that occur during a mapping process, can improve mapping accuracy of a previously mapped section, areas still to be mapped, or both.

In some implementations, a first data stream includes LIDAR data and a second data stream includes TOF or vision data. The second data stream can be used to verify loop closure determined using the first data stream. In some implementations, loop closure, or the act of loop closing, indicates that a robot, after traversing a distance, has returned to a previously visited region. Loop closure can include determining a physical location and orientation of the robot, e.g., thereby aiding trajectory planning for mission objectives.

In some implementations, a robot performs loop closure periodically, e.g., within short time intervals. Periodically closing loops can help improve localization and improve a robot's ability to move within a given area, such as a property mapped or being mapped.

One innovative aspect of the subject matter described in this specification is embodied in a method that includes obtaining a sample Light Detection and Ranging (LIDAR) profile generated by a drone; selecting a reference position based on the sample LIDAR profile; determining a LIDAR profile-based translation and rotation relative to a reference LIDAR profile of the reference position; determining an image-based translation and rotation relative to a reference image of the reference position; determining whether the LIDAR profile-based translation and rotation and the image-based translation and rotation satisfy a similarity threshold; and verifying, using a result of the determination, a predicted position of the drone.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, obtaining the sample LIDAR profile generated by the drone includes: obtaining a point cloud assembled by measurements taken by a LIDAR system of the drone over a period of time. In some implementations, selecting the reference position based on the sample LIDAR profile includes: obtaining one or more reference LIDAR profiles; identifying the reference LIDAR profile as a profile of the one or more reference LIDAR profiles that satisfies a similarity criteria with the sample LIDAR profile; and selecting the reference position as a position of the identified reference LIDAR profile.

In some implementations, identifying the reference LIDAR profile of the one or more reference LIDAR profiles that satisfies the similarity criteria with the sample LIDAR profile uses one or more operations of an iterative-closest point (ICP) algorithm. In some implementations, selecting the reference position as the position of the identified reference LIDAR profile includes: selecting the reference position as the position of the identified reference LIDAR profile from one or more positions represented by the identified reference LIDAR profile. In some implementations, actions include: generating multiple similarity indexes by comparing the sample LIDAR profile to at least one of the one or more reference LIDAR profiles; where identifying the reference LIDAR profile as the profile of the one or more reference LIDAR profiles that satisfies the similarity criteria with the sample LIDAR profile includes: identifying, using the multiple similarity indexes, the most similar similarity index of the multiple similarity indexes that satisfies the similarity criteria; and selecting the reference LIDAR as the profile associated with the identified most similar similarity index of the multiple similarity indexes.

In some implementations, determining the LIDAR profile-based translation and rotation relative to the reference LIDAR profile of the reference position comprises: determining one or more values representing a difference between the reference LIDAR profile and the sample LIDAR profile; and determining the LIDAR profile-based translation and rotation using the difference. In some implementations, the one or more values representing the difference between the reference LIDAR profile and the sample LIDAR profile include a rotation matrix and translation vector. In some implementations, determining the image-based translation and rotation relative to the reference image of the reference position includes: obtaining a sample image generated by the drone; determining one or more values representing a difference between the reference image and the sample image; and determining the image-based translation and rotation using the difference.

In some implementations, the one or more values representing the difference between the reference image and the sample image include a rotation matrix and translation vector. In some implementations, determining whether the LIDAR profile-based translation and rotation and the image-based translation and rotation satisfy the similarity threshold includes: generating one or more values representing a cosine similarity using one or more values representing the LIDAR profile-based translation and rotation and the image-based translation and rotation; and comparing the one or more values representing the cosine similarity to a threshold cosine similarity.

In some implementations, actions include: determining that the LIDAR profile-based translation and rotation and the image-based translation and rotation satisfy the similarity threshold; and verifying, using the determination, the predicted position of the drone. In some implementations, the predicted position is predicted by the drone using visual inertial odometry (VIO). In some implementations, selecting the reference position includes: determining a position of the drone; and selecting the reference position as a position within a threshold distance from the determined position of the drone.

The details of one or more embodiments of the invention are set forth in the accompanying drawings and the description below. Other features and advantages of the invention will become apparent from the description and the drawings.

BRIEF DESCRIPTION OF THE DRAWINGS

FIG. 4 is a flow diagram illustrating an example of a process for loop closure using multi-modal sensor data.

Like reference numbers and designations in the various drawings indicate like elements.

DETAILED DESCRIPTION

Figure 1:
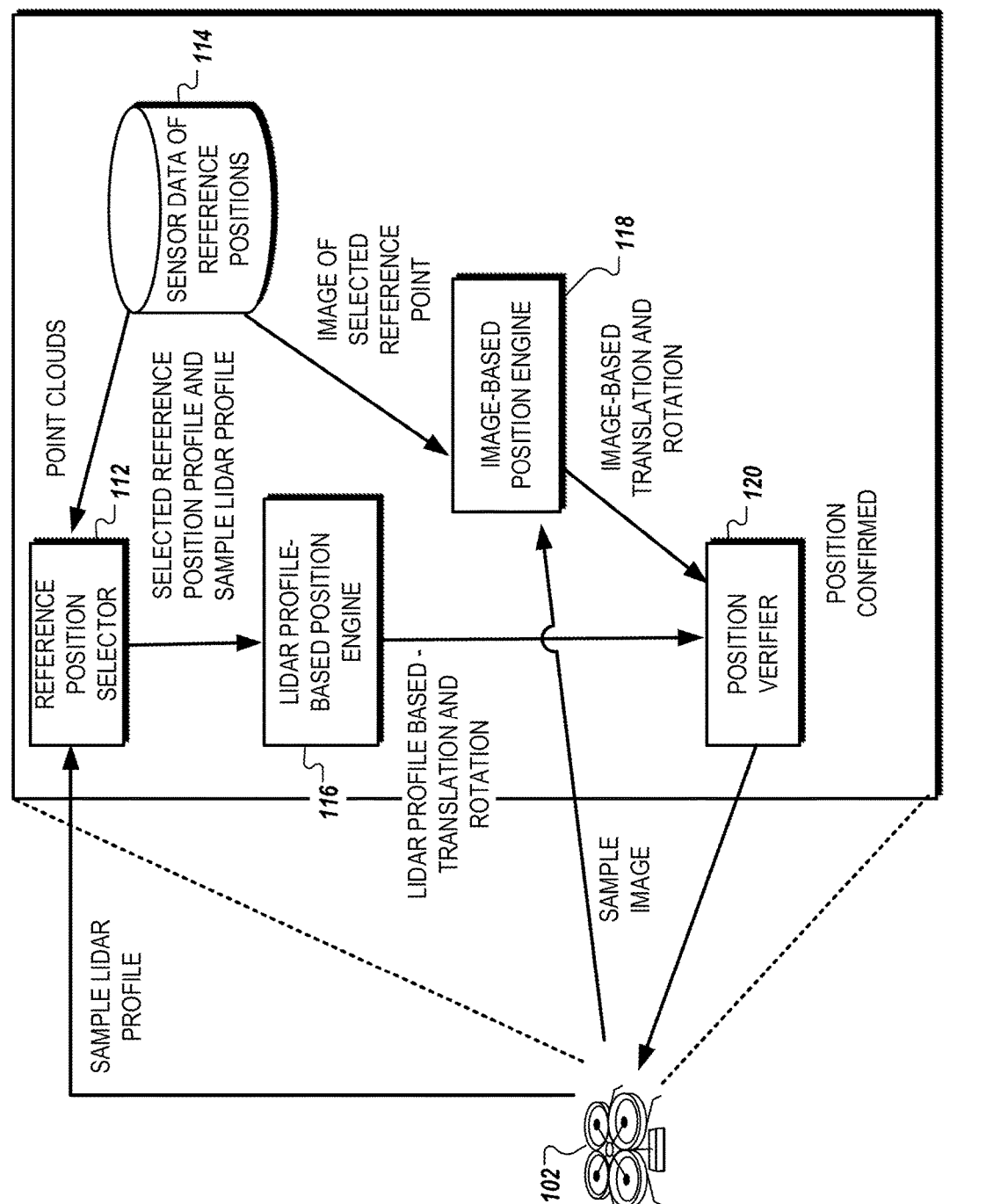
FIG. 1 is a diagram showing an example of a system for loop closure using multi-modal sensor data.

FIG. 1 is a diagram showing an example of a system 100 for exemplar generation and localization. The system 100 includes a drone 102 that includes a LIDAR sensor that senses distances from surfaces, a camera that captures visual images, a reference position selector 112 that selects a reference position based on a sample LIDAR profile, a data store 114 of sensor data of reference positions, a LIDAR profile-based position engine 116 that determines a translation and rotation based on the selected reference position, an image-based position engine 118 that determines a translation and rotation based on a reference image for the selected reference position and a sample image, and a position verifier 120 that verifies a position based on the determined translations and rotations.

When attempting loop closure, the drone 102 may generate a sample LIDAR profile with the LIDAR sensor. The sample LIDAR profile may represent LIDAR point clouds assembled over a time period, e.g., the past 5 to 10 seconds; across a physical space, e.g., the past 1 to 2 meters; or a combination of both. The sample LIDAR profile can represent a point cloud assembled across space when the drone 102 was substantially in the same location for a duration of time, e.g., 5 to 10 seconds, before moving to another location. In these situations, the drone 102 might have insufficient data to determine points for the point cloud when the drone is at substantially the same location, e.g., accounting for drift while trying to maintain the same location, for the duration of time but would likely have sufficient data as the drone 102 determines points across space.

For example, the drone 102 may generate a sample LIDAR profile that represents distances of surfaces based on measurements taken over the last 5 seconds, the last meter, or a combination of both. In some implementations, the LIDAR profile may be generated from sensed data from a single LIDAR sensor. In some implementations the LIDAR profile may be generated from sensed data from multiple LIDAR sensors. In some implementations, the LIDAR profile may be generated from sensed data from a single LIDAR sensor for one portion of the time period, or at one location across space, and from multiple LIDAR sensors for another portion of the time period, or at another location across space. The drone 102 may provide the sample LIDAR profile to the reference position selector 112.

The reference position selector 112 may receive the sample LIDAR profile and sensor data of reference positions from the data store 114 and select a reference position with a reference LIDAR profile that best matches the sample LIDAR profile. For example, the data store 114 may store multiple, e.g., one hundred or another number of, reference LIDAR profiles that each correspond to one of multiple, e.g., one hundred or another number of, reference positions of an environment in which the drone 102 is physically located, e.g., a building. The reference position selector 112 may determine and select, from the multiple reference positions, the reference position with a reference LIDAR profile that most closely matches the sample LIDAR profile. The data store 114 may store a reference LIDAR profile and a reference image for each reference image, where the reference image represents an image captured by a camera of the drone 102 at the reference position.

In some implementations, the reference position selector 112 may use iterative-closest point (ICP) algorithm to determine a difference between each of the reference LIDAR profiles and the sample LIDAR profile. The reference position selector 112 can select the reference position that corresponds to the reference LIDAR profile with the least difference from the sample LIDAR profile.

In some implementations, the reference position selector 112 may filter the reference positions to consider for matching based on a position of the drone determined using visual inertial odometry (VIO). For example, the drone 102 may use VIO to determine that the drone 102 may be at a particular position, then filter the reference positions to remove any reference positions that are not within a threshold distance from the particular position, e.g., not within ten, fifteen, twenty, etc. feet of the particular position. The reference position selector 112 can then select a reference position from the remaining reference positions. The reference position selector 112 may output a selected reference position and sample LIDAR profile to the LIDAR profile-based position engine 116.

In some implementations, the reference position selector 112 can select a reference position using a combination of VIO and ICP. For instance, the reference position selector 112 can use VIO to make an initial estimate of the drone's 102 position. The initial estimate can be within a certain ellipse of uncertainty, e.g., based on how well VIO was able to produce accurate odometry since our last localization. The initial estimate can be a closed reference position from the data store 114 of reference positions, e.g., given current VIO data.

The reference position selector 112 can use the initial estimate as input to an ICP algorithm. The reference position selector 112 can use the ICP algorithm to perform motion correction and determine a corrected position. For instance, the reference position selector 112 can use the ICP algorithm to refine the initial estimate within a search radius. If the reference position selector 112 successfully performs motion correction, the reference position selector can use the corrected position as a selected reference position.

If the reference position selector 112 does not successfully perform motion correction, e.g., because VIO drifted too much, the reference position selector 112 can select another reference position using another appropriate process. For example, the reference position selector 112 can use Bag-OfWords to select a reference position. As part of this process, the reference position selector 112 can compare a current camera image captured by a camera of the drone 102 with database images to determine an image from the database that is a closest match to the current camera image. The reference position selector 112 can use a location for the database image that is a closest match as input to the ICP algorithm. The reference position selector 112 can use an output from the ICP algorithm as the selected reference position.

In some implementations, the system 100 performs one or more actions to choose a reference position. For example, the system 100, e.g., the reference position selector 112, can access stored statistical analysis of every reference frame, such as Principal Component Analysis (PCA). The system 100 can apply one or more computation processes to a set of reference frames to generate Eigen vectors and associated Eigen values (e.g., 3 Eigen vectors and 3 Eigen values for 3D space). The Eigen vectors and associated Eigen values can characterize one or more physical structures a scan captures. The closest sample scan and reference scan can have approximately equal or similar Eigen values and Eigen vectors.

In some implementations, the reference position selector 112 generates one or more values indicating a difference between values representing a sample scan and a reference scan. For example, the reference position selector 112 can determine one or more difference values between Eigen vectors and associated Eigen values of a sample scan and Eigen vectors and associated Eigen values of a reference scan. The reference position selector 112 can select a reference position based on comparing generated difference values (e.g., to determine a location corresponding to the reference data with the smallest difference compared to sample as the reference position).

In some implementations, the system 100 uses closest point and difference values to improve position verification. For example, the system 100 can compare Eigen values to one or more dynamic or static thresholds. In general, for higher Eigen values, the greater the likelihood that the position verifier 120 can trust the LIDAR ICP output or that the loop closure using the LIDAR data is accurate.

The LIDAR profile-based position engine 116 may receive the selected reference position and sample LIDAR profile and determine a LIDAR profile-based translation and rotation. The position of the drone 102 may be represented by coordinates of the reference position combined with the translation and rotation. For instance, the translation and rotation from the reference position can indicate the position of the drone 102, during a time period ti when the drone 102 was at the position, with respect to the reference position. The time period ti can include the time periods when the LIDAR profile-based position engine 116 receives the selected reference position and sample LIDAR profile, or an earlier time period, e.g., for instance when the drone 102 might not be exactly at the position any longer.

The LIDAR profile-based position engine 116 may determine the LIDAR profile-based translation and rotation by determining an amount of translation and rotation of the reference LIDAR profile relative to the sample LIDAR profile for the drone's 102 position. For example, the translation and rotation may indicate that from the reference LIDAR profile, the sample LIDAR profile of the drone 102 may be one unit in a particular direction and rotated 10° along a particular axis.

Figure 2:
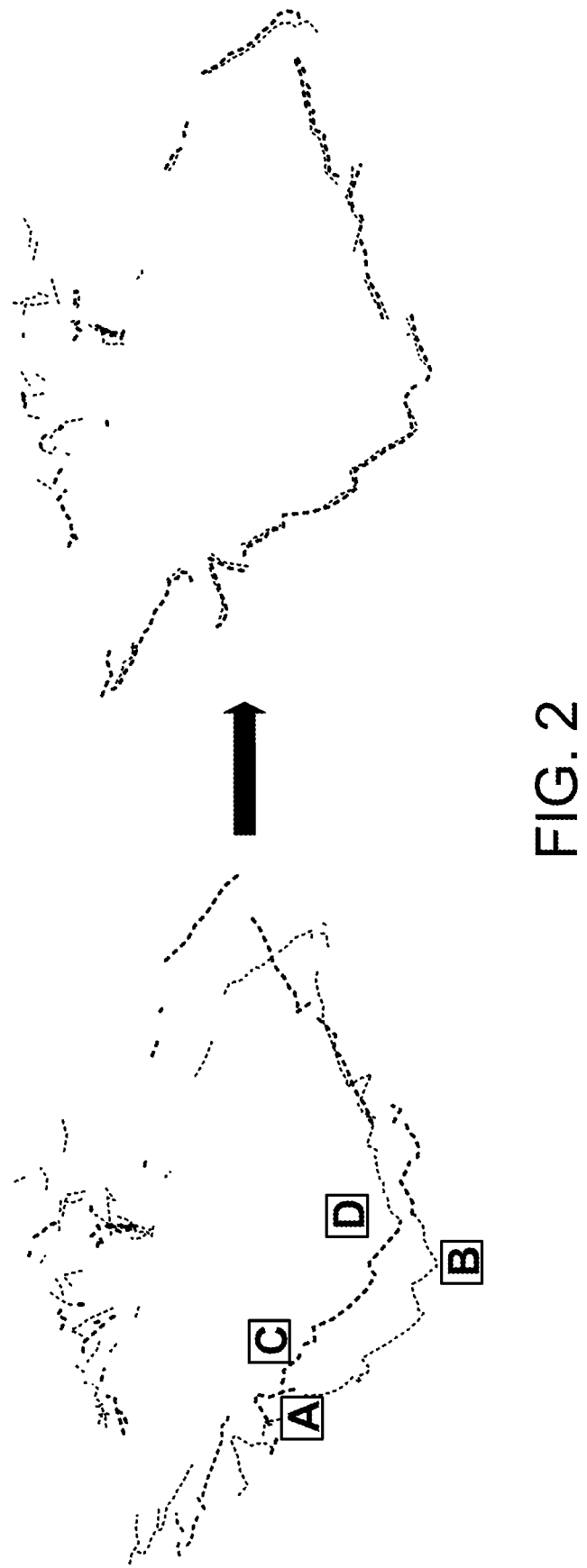
FIG. 2 is a diagram showing an example of matching LIDAR profiles.

FIG. 2 is a diagram showing an example of matching LIDAR profiles. The matching may be performed by the LIDAR profile-based position engine 116 where a path from C to D is taken during a mapping phase and a path from A to B is later taken while a task is being performed. The LIDAR profile-based position engine 116 may determine a rotation and translation from the LIDAR profile for the path C to D to the LIDAR profile for the path A to B. FIG. 2 shows an example of two dimensional (2D) LIDAR cloud matching. In some implementations, techniques described in reference to 2D LIDAR cloud matching are extended for three dimensions (3D), e.g., a ToF or LIDAR based array that generates a 3D scan.

Returning to FIG. 1, the drone 102 may provide a sample image just captured by the camera of the drone 102 and a reference image taken from the reference position that was selected to the image-based position engine 118. The image-based position engine 118 may determine an image-based translation and rotation based on the sample image and the reference image. For example, the image-based position engine 118 may determine a translation of one unit in a direction and a rotation of 10° along an axis. The axis can be the same axis as the particular axis or another axis. If the sample image just captured by the camera of the drone 102 is substantially similar to that of the reference image, the reference position should be substantially similar to, e.g., the same as, the selected reference position.

Figure 3:
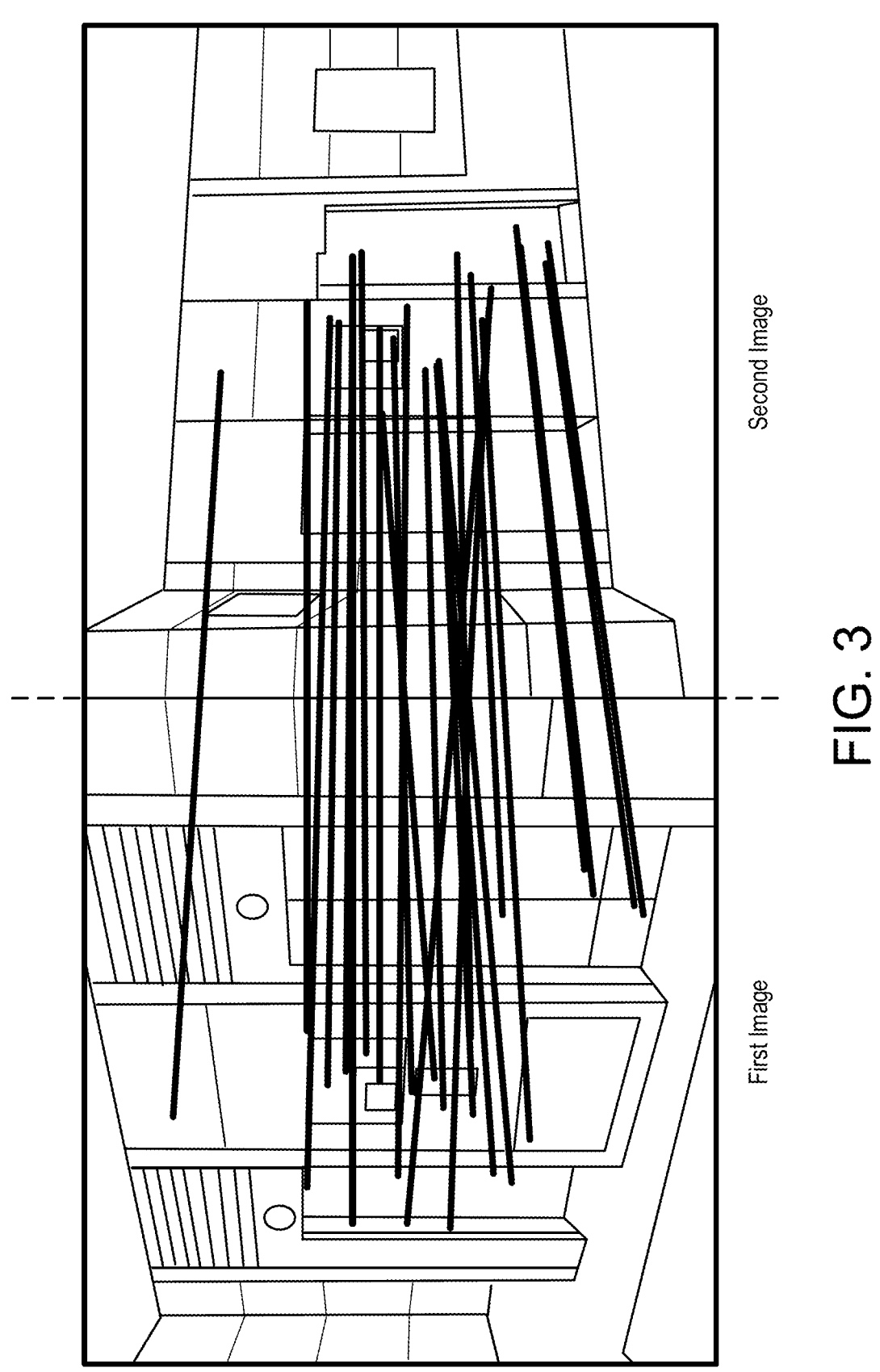
FIG. 3 is a diagram showing an example of matching feature points.

FIG. 3 is a diagram showing an example of matching feature points. For example, FIG. 3 shows various lines with ends that correspond to matching feature points between two different images of elevators taken from different positions. In some implementations, the image-based position engine 118 may determine the translation and rotation based on identifying feature points in the reference image, identifying feature points in the sample image, matching the feature points between the reference image and the sample image, and then determining the translation and rotation based on the matched feature points. For example, the image-based position engine 118 may identify local features and descriptors, or features from a trained feature detection neural network and the corresponding descriptors, and use intrinsic parameters of the camera known apriori to fit an Essential Matrix to the matched set of features upon imposing Epipolar constraints. The local features and descriptors can be scale-invariant feature transform (SIFT) features, speeded up robust features (SURF), corresponding descriptors, or a combination of these.

The position verifier 120 may receive the LIDAR profile-based translation and rotation and the image-based translation and rotation and, verify a position based on or using the LIDAR profile-based translation and rotation and the image-based translation and rotation. For example, the position verifier 120 may determine that the translations and rotations satisfy a similarity threshold, e.g., match or substantially match, and, in response, verify that a position is accurate. In another example, the position verifier 120 may determine that the translations and rotations do not satisfy the similarity threshold and, in response, determine that a position is inaccurate. Where the position verifier 120 determines that the position is inaccurate, the drone 102 may determine that the loop closure has failed and attempt to perform another loop closure at a later point in time, using another reference position, or both.

In some implementations, the similarity threshold can be any appropriate type of similarity threshold. For instance, the position verifier 120 can determine whether a differences between translations and rotations satisfy, e.g., be less than or equal to, a threshold. The position verifier 12 can determine whether rotation matrices that represent the rotations satisfy a rotation similarity threshold, e.g., have at least a predetermined amount of similarity, and translation vectors that represent the translations satisfy a translation similarity threshold, e.g., have at least a predetermined cosine similarity, or both.

Additionally or alternatively to using images to verify loop closure made with LIDAR, the drone 102 can use VIO to verify a loop closure made with LIDAR. The drone 102 may select a reference position based on the sample LIDAR profile, then estimate a linear and angular velocity of the drone 102 from a location of a prior loop closure to the selected reference position, determine a linear and angular velocity of the drone 102 determined from VIO over a same time period, and determine whether the linear and angular velocities satisfy a VIO similarity threshold, e.g., match or substantially match. For example, the drone 102 may determine whether the linear or angular velocities based on the VIO and based on the LIDAR profile are more than 10% off from one another and, if so, determine the loop closure is inaccurate. In another example, the drone 102 may determine whether the linear or angular velocities based on the VIO and based on the LIDAR profile are more than 10% off from one another and, if not, determine the loop closure is accurate.

In some examples, the drone 102 can use VIO data from a previous loop closure position to a current position to verify LIDAR loop closure. For instance, although VIO might drift over time, VIO data can be sufficiently accurate over shorter distances, e.g., enough to determine whether to reject an inaccurate loop closure. The drone 102 can determine a past position, e.g., including a previous loop closure. The drone 102 can add motion estimated by VIO since the past position to the past position to determine an estimated new position. The drone 102 can compare the estimated new position to the selected reference position. If differences between the estimated new position and the selected reference position satisfy one or more difference thresholds, the drone 102 can determine that the loop closure is accurate. If the differences between the estimated new position and the selected reference position do not satisfy the one or more difference thresholds, the drone 102 can determine that the loop closure is inaccurate.

In some implementations, the drone 102 can include more or fewer components. For instance, a single component can perform the operations described with reference to the reference position selector 112 and the LIDAR profile-based position engine 116. In some examples, a single component can perform the operations described with reference to the LIDAR profile-based position engine 116, and the image-based position engine 118.

The drone 102 can include several different functional components, including the reference position selector 112, the LIDAR profile-based position engine 116, the image-based position engine 118, and the position verifier 120. The reference position selector 112, the LIDAR profile-based position engine 116, the image-based position engine 118, the position verifier 120, or a combination of these, can include one or more data processing apparatuses, can be implemented in code, or a combination of both. For instance, each of the reference position selector 112, the LIDAR profile-based position engine 116, the image-based position engine 118, and the position verifier 120 can include one or more data processors and instructions, e.g., code, that cause the one or more data processors to perform the operations discussed herein.

The various functional components of the drone 102 can be installed on one or more computers as separate functional components or as different modules of a same functional component. For example, the reference position selector 112, the LIDAR profile-based position engine 116, the image-based position engine 118, the position verifier 120, or a combination of these, can be implemented as computer programs installed on one or more computers in one or more locations that are coupled to each through a network. In cloud-based systems for example, these components can be implemented by individual computing nodes of a distributed computing system.

FIG. 4 is a flow diagram illustrating an example of a process 400 for loop closure using multi-modal sensor data. Briefly, and as will be described in more detail below, the process 400 includes obtaining a sample LIDAR profile generated by a drone (402), selecting a reference position based on the sample LIDAR profile (404), determining a LIDAR profile-based translation and rotation relative to a reference LIDAR profile of the reference position (406), determining an image-based translation and rotation relative to a reference image of the reference position (408), and determining whether the LIDAR profile-based translation and rotation and the image-based translation and rotation satisfy a similarity threshold (410).

The process 400 includes obtaining a sample LIDAR profile generated by a drone (402). For example, the reference position selector 112 may obtain a point cloud assembled by measurements taken by a LIDAR of the drone 102 during a time period, e.g., the last 6 seconds.

The process 400 includes selecting a reference position based on the sample LIDAR profile (404). For example, the reference position selector 112 may obtain reference LIDAR profiles for a predetermined number of points, e.g., eight points, use an ICP algorithm to identify the reference LIDAR profile that best matches the sample LIDAR profile, and select the reference position that corresponds to the identified reference LIDAR profile. The reference LIDAR profile that best matches can include the reference LIDAR profile that has a highest similarity index when compared with at least a portion of the sample LIDAR profile. In some implementations, the reference position selector 112 generates multiple similarity indexes. For example, the reference position selector 112 can generate one or more values, e.g., numerical, vectors, matrices, among others, indicating a similarity between a sample LIDAR profile and one or more reference LIDAR profiles.

The process 400 includes determining a LIDAR profile-based translation and rotation relative to a reference LIDAR profile of the reference position (406). For example, the LIDAR profile-based position engine 116 may determine translation and rotation from the reference LIDAR profile of the selected reference position to the sample LIDAR profile.

The process 400 includes determining an image-based translation and rotation relative to a reference image of the reference position (408). For example, the image-based position engine 118 may receive the reference image and the sample image, and determine the translation and the rotation from the reference image to the sample image. The drone 102 can receive the sample image substantially concurrently with receipt of the LIDAR measurements used to obtain the sample LIDAR profile.

The process 400 includes determining whether the LIDAR profile-based translation and rotation and the image-based translation and rotation satisfy a similarity threshold (410). For example, the position verifier 120 may determine whether a distance between the translations and a distance between the rotations satisfy the similarity threshold. In some examples, the position verifier 120 can determine whether the translations and the rotations match.

The order of steps in the process 400 described above is illustrative only, and loop closure using the multi-modal sensor data can be performed in different orders. For example, the drone can determine the image-based translation and rotation prior to or substantially concurrently with the determination of the LIDAR profile-based translation, the selection of the reference position, obtaining the sample LIDAR profile, or a combination of these.

Figure 5:
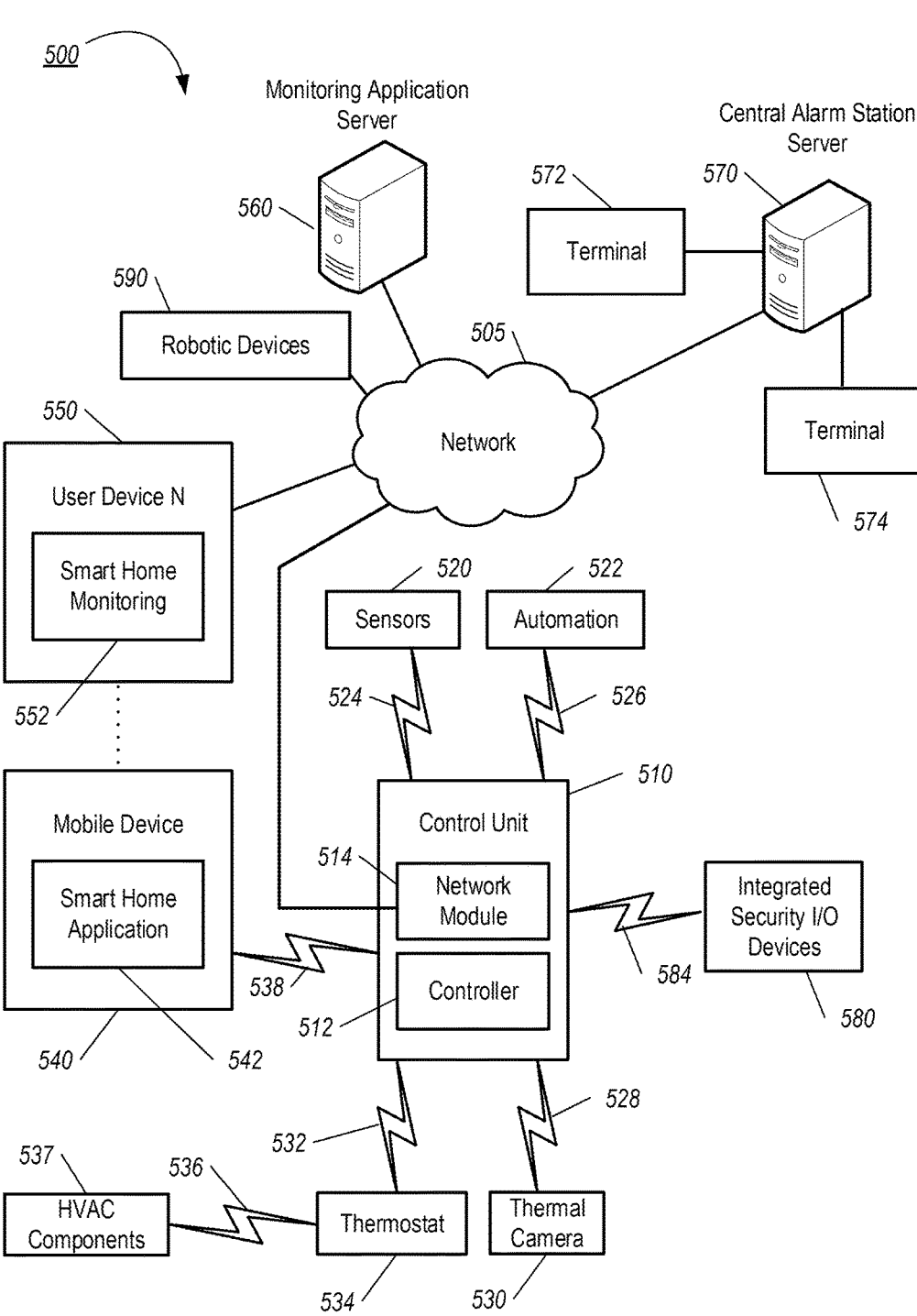
FIG. 5 is a diagram illustrating an example of a property monitoring system.

FIG. 5 is a diagram illustrating an example of a property monitoring system 500. In some cases, the property monitoring system 500 may include components of the system 100 of FIG. 1. For example, the drone 102 may be one of the robotic devices 590.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors 520. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The system 500 also includes one or more thermal cameras 530 that communicate with the control unit 510. The thermal camera 530 may be an IR camera or other type of thermal sensing device configured to capture thermal images of a scene. For instance, the thermal camera 530 may be configured to capture thermal images of an area within a building or home monitored by the control unit 510. The thermal camera 530 may be configured to capture single, static thermal images of the area and also video thermal images of the area in which multiple thermal images of the area are captured at a relatively high frequency (e.g., thirty images per second). The thermal camera 530 may be controlled based on commands received from the control unit 510. In some implementations, the thermal camera 530 can be an IR camera that captures thermal images by sensing radiated power in one or more IR spectral bands, including NIR, SWIR, MWIR, and/or LWIR spectral bands.

The thermal camera 530 may be triggered by several different types of techniques. For instance, a Passive Infra-Red (PIR) motion sensor may be built into the thermal camera 530 and used to trigger the thermal camera 530 to capture one or more thermal images when motion is detected. The thermal camera 530 also may include a microwave motion sensor built into the camera and used to trigger the thermal camera 530 to capture one or more thermal images when motion is detected. The thermal camera 530 may have a "normally open" or "normally closed" digital input that can trigger capture of one or more thermal images when external sensors (e.g., the sensors 520, PIR, door/window, etc.) detect motion or other events. In some implementations, the thermal camera 530 receives a command to capture an image when external devices detect motion or another potential alarm event. The thermal camera 530 may receive the command from the controller 512 or directly from one of the sensors 520.

In some examples, the thermal camera 530 triggers integrated or external illuminators (e.g., Infra-Red or other lights controlled by the property automation controls 522, etc.) to improve image quality. An integrated or separate light sensor may be used to determine if illumination is desired and may result in increased image quality.

The thermal camera 530 may be programmed with any combination of time/day schedules, monitoring system status (e.g., "armed stay," "armed away," "unarmed"), or other variables to determine whether images should be captured or not when triggers occur. The thermal camera 530 may enter a low-power mode when not capturing images. In this case, the thermal camera 530 may wake periodically to check for inbound messages from the controller 512. The thermal camera 530 may be powered by internal, replaceable batteries if located remotely from the control unit 510. The thermal camera 530 may employ a small solar cell to recharge the battery when light is available. Alternatively, the thermal camera 530 may be powered by the controller's 512 power supply if the thermal camera 530 is co-located with the controller 512.

In some implementations, the thermal camera 530 communicates directly with the monitoring server 560 over the Internet. In these implementations, thermal image data captured by the thermal camera 530 does not pass through the control unit 510 and the thermal camera 530 receives commands related to operation from the monitoring server 560.

In some implementations, the system 500 includes one or more visible light cameras, which can operate similarly to the thermal camera 530, but detect light energy in the visible wavelength spectral bands. The one or more visible light cameras can perform various operations and functions within the property monitoring system 500. For example, the visible light cameras can capture images of one or more areas of the property, which the cameras, the control unit, and/or another computer system of the monitoring system 500 can process and analyze.

The system 500 also includes one or more property automation controls 522 that communicate with the control unit to perform monitoring. The property automation controls 522 are connected to one or more devices connected to the system 500 and enable automation of actions at the property. For instance, the property automation controls 522 may be connected to one or more lighting systems and may be configured to control operation of the one or more lighting systems. Also, the property automation controls 522 may be connected to one or more electronic locks at the property and may be configured to control operation of the one or more electronic locks (e.g., control Z-Wave locks using wireless communications in the Z-Wave protocol). Further, the property automation controls 522 may be connected to one or more appliances at the property and may be configured to control operation of the one or more appliances. The property automation controls 522 may include multiple modules that are each specific to the type of device being controlled in an automated manner. The property automation controls 522 may control the one or more devices based on commands received from the control unit 510. For instance, the property automation controls 522 may interrupt power delivery to a particular outlet of the property or induce movement of a smart window shade of the property.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at the property and/or environmental data at the home, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more property automation controls 522.

In some implementations, a module 537 is connected to one or more components of an HVAC system associated with the property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robot that are capable of moving and taking actions that assist in home monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan of a building on the property and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, one or more of the thermal cameras 530 may be mounted on one or more of the robotic devices 590.

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 can be associated with one or more charging stations. The charging stations may be located at predefined home base or reference locations at the property. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact-based charging stations and/or wireless charging stations. For contact-based charging stations, the robotic devices 590 may have readily accessible points of contact that the robotic devices 590 are capable of positioning and mating with a corresponding contact on the charging station. For instance, a helicopter type robotic device 590 may have an electronic contact on a portion of its landing gear that rests on and mates with an electronic pad of a charging station when the helicopter type robotic device 590 lands on the charging station. The electronic contact on the robotic device 590 may include a cover that opens to expose the electronic contact when the robotic device 590 is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device 590 may always use a first charging station and a second robotic device 590 may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device 590 to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the property automation controls 522, the thermal camera 530, the thermostat 534, and the integrated security devices 580 may communicate with the controller 512 over communication links 524, 526, 528, 532, and 584. The communication links 524, 526, 528, 532, and 584 may be a wired or wireless data pathway configured to transmit signals from the sensors 520, the property automation controls 522, the thermal camera 530, the thermostat 534, and the integrated security devices 580 to the controller 512. The sensors 520, the property automation controls 522, the thermal camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the property automation controls 522, the thermal camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is one or more electronic devices configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor data, thermal image data, and other monitoring system data received from the monitoring system and perform analysis of the sensor data, thermal image data, and other monitoring system data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, thermal image, and other data to determine an activity pattern of a resident of the property monitored by the system 500. In some implementations, the monitoring server 560 may analyze the data for alarm conditions or may determine and perform actions at the property by issuing commands to one or more of the automation controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the thermal camera 530 and/or reports related to the monitoring system. Although FIG. 5 illustrates two user devices for brevity, actual implementations may include more (and, perhaps, many more) or fewer user devices.

The smart home application 542 and the smart home user interface 552 can allow a user to interface with the property monitoring system 500, for example, allowing the user to view monitoring system settings, adjust monitoring system parameters, customize monitoring system rules, and receive and view monitoring system messages.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors 520 and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system 500.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the property automation controls 522, the thermal camera 530, and the robotic devices 590. The one or more user devices 540 and 550 receive data directly from the sensors 520, the property automation controls 522, the thermal camera 530, and the robotic devices 590 (i.e., the monitoring system components) and sends data directly to the monitoring system components. The one or more user devices 540, 550 provide the appropriate interfaces/processing to provide visual surveillance and reporting.

In other implementations, the system 500 further includes network 505 and the sensors 520, the property automation controls 522, the thermal camera 530, the thermostat 534, and the robotic devices 59 are configured to communicate sensor and image data to the one or more user devices 540 and 550 over network 505 (e.g., the Internet, cellular network, etc.). In yet another implementation, the sensors 520, the property automation controls 522, the thermal camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the property automation controls 522, the thermal camera 530, the thermostat 534, and the robotic devices 590 to a pathway over network 505 when the one or more user devices 540 and 550 are farther from the sensors 520, the property automation controls 522, the thermal camera 530, the thermostat 534, and the robotic devices 590. In some examples, the system leverages GPS information from the one or more user devices 540 and 550 to determine whether the one or more user devices 540 and 550 are close enough to the monitoring system components to use the direct local pathway or whether the one or more user devices 540 and 550 are far enough from the monitoring system components that the pathway over network 505 is required. In other examples, the system leverages status communications (e.g., pinging) between the one or more user devices 540 and 550 and the sensors 520, the property automation controls 522, the thermal camera 530, the thermostat 534, and the robotic devices 590 to determine whether communication using the direct local pathway is possible. If communication using the direct local pathway is possible, the one or more user devices 540 and 550 communicate with the sensors 520, the property automation controls 522, the thermal camera 530, the thermostat 534, and the robotic devices 590 using the direct local pathway. If communication using the direct local pathway is not possible, the one or more user devices 540 and 550 communicate with the monitoring system components using the pathway over network 505.

In some implementations, the system 500 provides end users with access to thermal images captured by the thermal camera 530 to aid in decision making. The system 500 may transmit the thermal images captured by the thermal camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 530 or other cameras of the system 500). In these implementations, the thermal camera 530 may be set to capture thermal images on a periodic basis when the alarm system is armed in an "armed away" state, but set not to capture images when the alarm system is armed in an "armed stay" or "unarmed" state. In addition, the thermal camera 530 may be triggered to begin capturing thermal images when the alarm system detects an event, such as an alarm event, a door-opening event for a door that leads to an area within a field of view of the thermal camera 530, or motion in the area within the field of view of the thermal camera 530. In other implementations, the thermal camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure. A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback;

and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

What is claimed is:

1. A method comprising:
   obtaining a sample Light Detection and Ranging (LIDAR) profile generated by a drone;
   selecting a reference position based on the sample LIDAR profile;
   determining a LIDAR profile-based translation and rotation relative to a reference LIDAR profile of the reference position to substantially align the obtained sample LIDAR profile with the reference LIDAR profile;

determining an image-based translation and rotation relative to a reference image of the reference position to substantially align a sample image generated by the drone with the reference image;
   determining whether the LIDAR profile-based translation and rotation and the image-based translation and rotation satisfy a similarity threshold;
   verifying, using a result of the determination, a predicted position of the drone; and
   controlling navigation of the drone using a result of the verification.

2. The method of claim 1, wherein obtaining the sample LIDAR profile generated by the drone comprises:
   obtaining a point cloud assembled by measurements taken by a LIDAR system of the drone over a period of time.

3. The method of claim 1, wherein selecting the reference position based on the sample LIDAR profile comprises:
   obtaining one or more reference LIDAR profiles;
   identifying the reference LIDAR profile as a profile of the one or more reference LIDAR profiles that satisfies a similarity criteria with the sample LIDAR profile; and
   selecting the reference position as a position of the identified reference LIDAR profile.

4. The method of claim 3, wherein identifying the reference LIDAR profile of the one or more reference LIDAR profiles that satisfies the similarity criteria with the sample LIDAR profile uses one or more operations of an iterative-closest point (ICP) algorithm.

5. The method of claim 3, wherein selecting the reference position as the position of the identified reference LIDAR profile comprises:
   selecting the reference position as the position of the identified reference LIDAR profile from one or more positions represented by the identified reference LIDAR profile.

6. The method of claim 3, comprising:
   generating multiple similarity indexes by comparing the sample LIDAR profile to at least one of the one or more reference LIDAR profiles;
   wherein identifying the reference LIDAR profile as the profile of the one or more reference LIDAR profiles that satisfies the similarity criteria with the sample LIDAR profile comprises:
   identifying, using the multiple similarity indexes, the most similar similarity index of the multiple similarity indexes that satisfies the similarity criteria; and
   selecting the reference LIDAR as the profile associated with the identified most similar similarity index of the multiple similarity indexes.

7. The method of claim 1, wherein determining the LIDAR profile-based translation and rotation relative to the reference LIDAR profile of the reference position comprises:
   determining one or more values representing a difference between the reference LIDAR profile and the sample LIDAR profile; and
   determining the LIDAR profile-based translation and rotation using the difference.

8. The method of claim 7, wherein the one or more values representing the difference between the reference LIDAR profile and the sample LIDAR profile include a rotation matrix and translation vector.

9. The method of claim 1, wherein determining the image-based translation and rotation relative to the reference image of the reference position comprises:
   obtaining the sample image generated by the drone;

determining one or more values representing a difference between the reference image and the sample image; and determining the image-based translation and rotation using the difference.

10. The method of claim 9, wherein the one or more values representing the difference between the reference image and the sample image include a rotation matrix and translation vector.

11. The method of claim 1, wherein determining whether the LIDAR profile-based translation and rotation and the image-based translation and rotation satisfy the similarity threshold comprises:

generating one or more values representing a cosine similarity using one or more values representing the LIDAR profile-based translation and rotation and the image-based translation and rotation; and comparing the one or more values representing the cosine similarity to a threshold cosine similarity.

12. The method of claim 1, comprising:

determining that the LIDAR profile-based translation and rotation and the image-based translation and rotation satisfy the similarity threshold; and verifying, using the determination, the predicted position of the drone.

13. The method of claim 12, wherein the predicted position is predicted by the drone using visual inertial odometry (VIO).

14. The method of claim 1, wherein selecting the reference position comprises:

determining a position of the drone; and selecting the reference position as a position within a threshold distance from the determined position of the drone.

15. A non-transitory computer-readable medium storing one or more instructions executable by a computer system to perform operations comprising:

obtaining a sample Light Detection and Ranging (LIDAR) profile generated by a drone;

selecting, from a plurality of candidate reference positions, a reference position with a reference LIDAR profile and a reference image using the sample LIDAR profile;

determining a LIDAR profile-based translation and rotation relative to the reference LIDAR profile of the reference position to substantially align the sample LIDAR profile with the reference LIDAR profile;

determining an image-based translation and rotation relative to the reference image of the reference position to substantially align a sample image generated by the drone with the reference image;

determining whether the LIDAR profile-based translation and rotation and the image-based translation and rotation satisfy a similarity threshold;

verifying, using a result of the determination, a predicted position of the drone; and controlling navigation of the drone using a result of the verification.

16. The medium of claim 15, wherein obtaining the sample LIDAR profile generated by the drone comprises:

obtaining a point cloud assembled by measurements taken by a LIDAR system of the drone over a period of time.

17. The medium of claim 15, wherein selecting the reference position based on the sample LIDAR profile comprises:

obtaining one or more reference LIDAR profiles;

identifying the reference LIDAR profile as a profile of the one or more reference LIDAR profiles that satisfies a similarity criteria with the sample LIDAR profile; and selecting the reference position as a position of the identified reference LIDAR profile.

18. The medium of claim 17, wherein identifying the reference LIDAR profile of the one or more reference LIDAR profiles that satisfies the similarity criteria with the sample LIDAR profile uses one or more operations of an iterative-closest point (ICP) algorithm.

19. The medium of claim 17, wherein selecting the reference position as the position of the identified reference LIDAR profile comprises:

selecting the reference position as the position of the identified reference LIDAR profile from one or more positions represented by the identified reference LIDAR profile.

20. A system comprising:

one or more processors; and machine-readable media interoperably coupled with the one or more processors and storing one or more instructions that, when executed by the one or more processors, perform operations comprising:

obtaining a sample Light Detection and Ranging (LIDAR) profile generated by a drone;

selecting, from a plurality of candidate reference positions, a reference position with a reference LIDAR profile and a reference image using the sample LIDAR profile;

determining a LIDAR profile-based translation and rotation relative to the reference LIDAR profile of the reference position to substantially align the sample LIDAR profile with the reference LIDAR profile;

determining an image-based translation and rotation relative to the reference image of the reference position to substantially align a sample image generated by the drone with the reference image;

determining whether the LIDAR profile-based translation and rotation and the image-based translation and rotation satisfy a similarity threshold;

verifying, using a result of the determination, a predicted position of the drone; and controlling navigation of the drone using a result of the verification.

\* \* \* \* \*